United States Patent Office 2,766,233
Patented Oct. 9, 1956

2,766,233

POLYMETHINE DYES FOR SYNTHETIC FIBERS

Nicholas J. Kartinos, Chicago, Ill., and James B. Normington, Belvidere, N. J., assignors to General Aniline & Film Corporation, New York, N. Y., a corporation of Delaware No Drawing. Application December 11, 1953,
Serial No. 397,773

6 Claims. (Cl. 260—240)

This invention relates to polymethine dyes and particularly to an improved class of such dyes having excellent fastness to light, washing, high tinctorial strength and other useful properties.

We have found that polymethine dyes obtained by condensing a substituted p,p'-iminodiaryl dialdehyde with a compound containing an active methylene group in the presence of a basic or acid condensing agent yield dyes which are not only of high tinctorial strength and of excellent light and wash fastness, excellent sublimation properties, but also because of their brilliance and/or fluorescence are adaptable as fluorescent pigments and as brightening agents. The polymethine dyes are particularly adaptable for dyeing the currently available synthetic fibers, such as, acetate, nylon, Dacron (polyester fiber from terephthalic acid and ethylene glycol) and Dynel (copolymer of acrylonitrile and vinyl chloride) to which they impart fluorescent green-yellow shades of excellent light and wash fastness, and display exceptionally high tinctorial strength.

These polymethine dyes are characterized by the following general formulae:

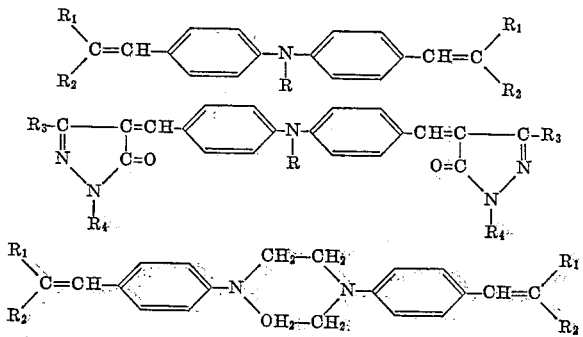

wherein R represents a lower alkyl, e. g., methyl, ethyl, propyl, butyl, isobutyl, etc., a phenyl radical, or a

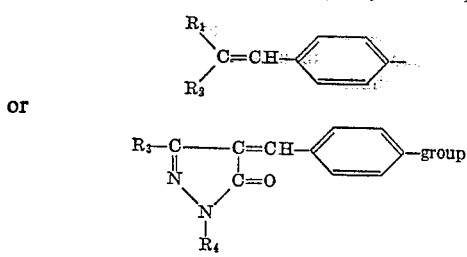

$R_1$ represents acetyl, cyano or carbalkoxy, e. g., carbomethoxy, carbethoxy, carbopropoxy, carbobutoxy, etc., $R_2$ represents a benzyl or a carbalkoxy group of the same value as in $R_1$, acetyl, carbamide, N-alkyl-carbamide, i. e., N-methyl-, N-ethyl-, N-propyl-, and N-butyl-carbamide, etc., N,N-dialkyl-carbamide, i. e., N,N-dimethyl-, N,N-diethyl-, N,N-dipropyl-, and N,N-dibutyl-carbamide, etc., N-hydroxyalkyl-carbamide, e. g., N-hydroxyethyl-, N-hydroxypropyl-, and N-hydroxybutyl-carbamide, carbochloroethoxy, carbohydroxyethoxy, cyanocarbethoxy, p-tolylsulfone and tetrahydrofurfuryl group, $R_3$ represents either carboethoxy, carboxy, or methyl, and $R_4$ represents either hydrogen, phenyl or substituted phenyl, e. g., o-chloro, -m-sulfonamido-phenyl and the like.

In preparing the polymethine dyes characterized by the foregoing formula a substituted p,p'-iminodiaryl dialdehyde is condensed with an active methylene compound in the presence of an acid or basic catalyst with or without a solvent. A basic catalyst, however, is preferred, such as for example, alkaline alkoxide, alkaline, such as, sodium or potassium or alkaline earth oxides and hydroxides, carbonate, and any of a variety of primary, secondary or tertiary amines normally used in condensation reactions of this type. In addition, heterocyclic tertiary or secondary amines, such as, piperidine, morpholine, pyridine, quinoline, tetrahydroquinoline and the like may be employed. A neutral organic solvent, whether polar or non-polar and non-interfering in the condensation reaction may be employed if desired. Such solvents constitute isopropanol, chloroform, ethanol, methanol, chlorobenzene. As examples of substituted p,p'-iminodiaryl dialdehydes which are employed in the foregoing condensation, the following may be mentioned as being illustrative.

N-methyl-p,p'-iminodibenzaldehyde
N-ethyl-p,p'-iminodibenzaldehyde
N-propyl-p,p'-iminodibenzaldehyde
N-butyl-p,p'-iminodibenzaldehyde
N-phenyl-p,p'-iminodibenzaldehyde In addition to the foregoing dialdehydes, compounds obtained by reacting a tertiary amine having two to three benzene rings attached to the amino nitrogen with a lower dialkyl formamide, according to the process described in U. S. P. 2,558,285, may be employed. In place of the specific amines disposed in that patent, the following may be used in like manner to yield the dialdehydes useful for the purpose of the present invention: N - methyldiphenylamine, N,3 - dimethyldiphenylamine, N,3,3'-trimethyldiphenylamine, N - methyl-3-methoxydiphenylamine, N-ethyl-3,3'-dimethoxydiphenylamine, N-propyl - 3 - methyl-3'-methoxydiphenylamine, N - butyl-3-chlorodiphenylamine, N - butyl - 3,3' - dichlorodiphenylamine, N-ethyl-3-methyl-3'-chlorodiphenylamine, N-ethyl-3-chloro-3'-methoxydiphenylamine, N-methyl-3-hydroxydiphenylamine, N-ethyl-3,3'-dihydroxydiphenylamine, N-ethyl-3-hydroxy-3'-methyldiphenylamine, N-propyl-3-hydroxy-3'-chlorodiphenylamine, N-phenyl - 3 - hydroxy-3'-ethoxydiphenylamine, N,3,5-trimethyldiphenylamine and others of thesse various isomers.

As regards examples of compounds containing an active methylene group, any type of compound can be employed provided it contains such a group and condenses with an aldehyde by splitting off with water, with the resulting formation of a carbon-carbon double bond. Suitable compounds of this type are for example: derivatives of cyanoacetic acid, such as their esters and amides, derivatives of malonic acid such as malonitrile, malonic esters, and the like, pyrazolones, dimethyl dihydroresorcinol, indolines, oxindoles and the like. Acetoacetic esters, acetoacetamides, benzyl cyanides and the like are also included in this class of compounds.

The following are more specific examples of such active methylene compounds: ethyl cyanoacetate, cyanoethyl cyanoacetate, hydroxethyl cyanoacetate, chloroethyl cyanoacetate, tetrahydrofurfuryl cyanoacetate, diethyl malonate, dicyanoethyl malonate, cyanoethyl hydroxethyl malonate, cyanoethyl ethyl malonate, cyanoethyl chloroethyl malonate, malonitrile, ethyl acetoacetate, acetoacetamide, cyanoacetamide, N-ethyl cyanoacetamide, N,N-diethyl cyanoacetamide, N-hydroxyethyl cyanoacetamide, 1-phenyl-3-methyl - 5 - pyrazolone, 1-phenyl-3-carboxy-5-pyrazolone, 2'-chlorophenyl-3-methyl-5-pyrazolone, 2',5'-dichloro - 3 - methyl - 5 - pyrazolone, 1-(3' - sulfonamidophenyl)-3-methyl-5-pyrazolone, dimethyl dihydroresorcinol, barbituric acid, N-methyloxindole, 1,3,3-trimethyl-2-methylene-indoline, 5-methoxy-1,3,3-trimethyl-2-methylene-indoline, phenyl acetonitrile, p-chlorophenylacetonitrile, p-cyanophenylacetonitrile, etc.

The following examples will illustrate the manner in which the polymethine dyes of the present invention are prepared. It is to be clearly understood that these examples are merely illustrative and are not to be construed as being limitative.

*Example I*

Into a reflux flask were placed 12 grams of N-methyl-p,p'-iminodibenzaldehyde, 13 grams of ethyl cyanoacetate, 50 ml. of isopropanol and 5 drops of piperidine. The mixture was agitated and heated under reflux for one hour. Upon cooling the bright orange solid that separated was collected and dried. The yield of the dry product was 17.5 grams, having a melting point of 120-1° C. and represents a yield of 81% of the theoretical amount.

*Example II*

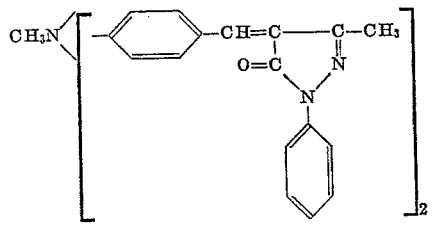

Example I was repeated with the exception that 13 grams of ethyl cyanoacetate were replaced by 18 grams of 1-phenyl-3-methyl-5-pyrazolone. The yield of the product was 26 grams having a melting point of 139-143° C. which amounted to 95% of the theoretical amount.

*Example III*

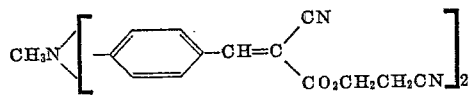

Example I was repeated with the exception that 13 grams of ethyl cyanoacetate were replaced by 16 grams of cyanoethyl cyanoacetate. The yield of the product was 26.5 grams having a melting point of 134-6° C. which amounted to 99+% of the theoretical amount.

*Example IV*

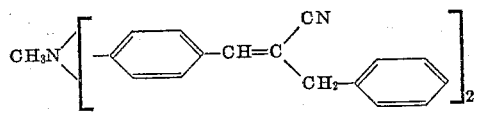

12 grams N-methylimino-bis-benzaldehyde, 13 grams benzyl cyanide (phenyl acetonitrile), 50 cc. methanol and 0.01 gram sodium methoxide were refluxed for 4 hours, cooled and the product filtered. It was a tan solid melting at 131-142° C.

*Example V*

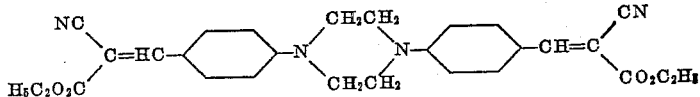

14.7 grams N,N'-di-(p,p'-di-formylphenyl)piperazine, 24.0 grams ethyl cyanoacetate, 100 cc. isopropanol and 5 drops of piperidine were refluxed 3 hours. The solution was cooled and the precipitate was collected. It had a brownish appearance, weighed 19 grams and melted above 250° C.

*Example VI*

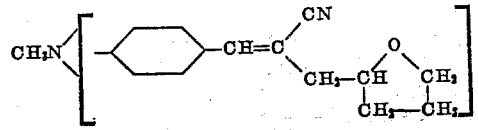

12 grams N-methyliminobis-benzaldehyde, 17 grams tetrahydrofurfuryl cyanoacetate, 50 cc. isopropanol, and 5 drops of piperidine were refluxed for 30 minutes. The mixture was cooled and the solid collected. Yield 27.5 grams (100%) melting point 102-8° C.

*Example VII*

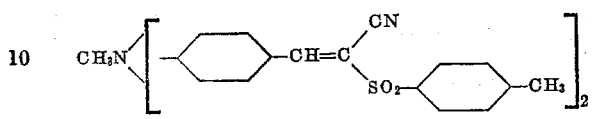

12 grams N-methylimino-bis-benzaldehyde, 20 grams cyanomethyl p-tolyl sulfone, 50 cc. isopropanol, and 5 drops of piperidine were refluxed for 30 minutes. The mixture was cooled and the solid collected. Upon recrystallization from ethanol, there was obtained 16 grams of product (54%) melting at 140-4° C.

*Example VIII*

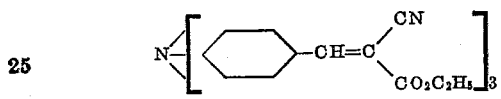

11 grams tri-(p,p',p''-formylphenyl)amine, 11 grams ethyl cyanoacetate, 50 cc. ethanol and 5 drops of piperidine were refluxed for one hour. The mixture was cooled and 5.3 grams (30%) of product was isolated. It melted at 148-160° C.

*Example IX*

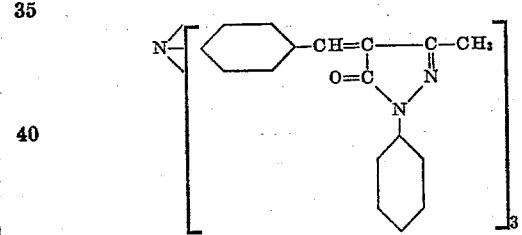

6.6 grams tri-(p,p',p''-formylphenyl)amine, 10.8 grams 3-methyl-1-phenyl-5-pyrazolone, 25 cc. ethanol and 5 drops of piperidine were heated at reflux for 30 minutes. On cooling, an oil separated. This later solidified to give 15.5 grams (96%) of a material melting at 172-180° C.

While we have disclosed the preferred embodiments of our invention, it will be readily apparent to those skilled in the art that many changes may be made in the processing steps disclosed above without departing from the spirit thereof. The scope of the invention is to be limited solely by the appended claims.

We claim:

1. Polymethine dyestuffs selected from the class consisting of the following formulae:

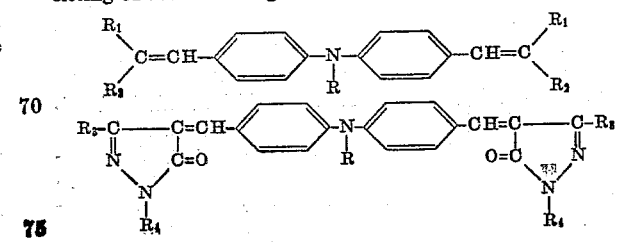

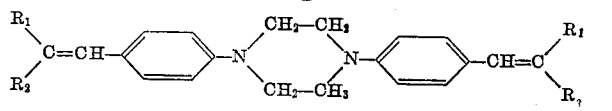

wherein R represents a member selected from the class consisting of lower alkyl, phenyl,

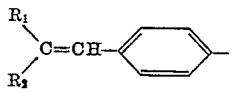

and

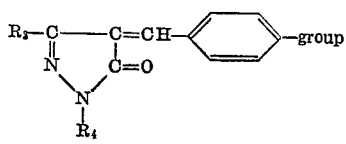

$R_1$ represents a member selected from the class consisting of acetyl, cyano and carbalkoxy groups in which the alkyl of the carbalkoxy group is a lower alkyl group, $R_2$ represents a member selected from the class consisting of acetyl, carbamide, carbalkoxy, dialkyl carbamide and N-hydroxy alkyl carbamide groups in which the alkyl is a lower alkyl group, carbochloroethoxy, carbohydroxyethoxy, cyanocarbethoxy, p-tolylsulfone, benzyl, and tetrahydrofurfuryl groups, $R_3$ represents a member selected from the class consisting of methyl, carboxy and carboethoxy groups, and $R_4$ represents a member selected from the class consisting of hydrogen, phenyl, chlorophenyl and sulfonamidophenyl groups.

2. A polymethine dyestuff having the following formula:

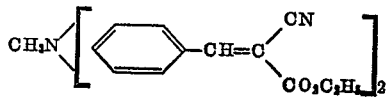

3. A polymethine dyestuff having the following formula:

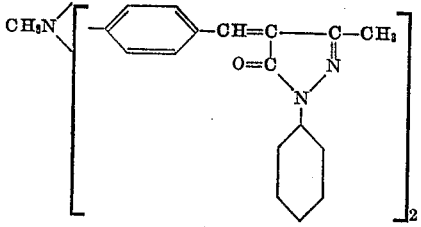

4. A polymethine dyestuff having the following formula:

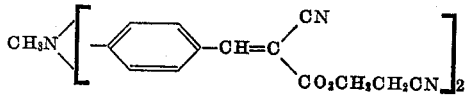

5. A polymethine dyestuff having the following formula:

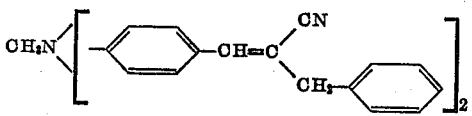

6. A polymethine dyestuff having the following formula:

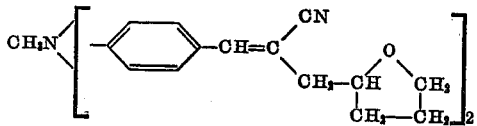

References Cited in the file of this patent

UNITED STATES PATENTS

| | | |
|---|---|---|
| 2,028,141 | Ackerman | Jan. 21, 1936 |
| 2,437,370 | Wilson | Mar. 8, 1948 |
| 2,465,412 | Wilson | Mar. 29, 1949 |
| 2,558,285 | Wilson | June 26, 1951 |